United States Patent
Wall

(10) Patent No.: US 12,050,742 B2
(45) Date of Patent: Jul. 30, 2024

(54) ARRANGEMENT FOR A PASSENGER COMPARTMENT OF A VEHICLE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/924,835

(22) PCT Filed: Apr. 23, 2021

(86) PCT No.: PCT/EP2021/060669
§ 371 (c)(1),
(2) Date: Nov. 11, 2022

(87) PCT Pub. No.: WO2021/228530
PCT Pub. Date: Nov. 18, 2021

(65) Prior Publication Data
US 2023/0214032 A1   Jul. 6, 2023

(30) Foreign Application Priority Data

May 13, 2020   (DE) ...................... 10 2020 112 938.6

(51) Int. Cl.
*G06F 3/041* (2006.01)
*B60K 35/00* (2024.01)
(Continued)

(52) U.S. Cl.
CPC .............. *G06F 3/041* (2013.01); *B60K 35/00* (2013.01); *B60K 35/10* (2024.01); *B60K 35/22* (2024.01);
(Continued)

(58) Field of Classification Search
CPC ........ G06F 3/041–04897; B60K 35/00; B60K 2370/143; B60K 2370/67;
(Continued)

(56) References Cited

U.S. PATENT DOCUMENTS

2011/0175798 A1   7/2011   Sato et al.
2014/0355235 A1*  12/2014   Kato .................. B60R 11/0235
                                                       361/809
(Continued)

FOREIGN PATENT DOCUMENTS

DE   10 2005 035 645 A1   2/2006
DE      102014009609 A1   12/2014
(Continued)

OTHER PUBLICATIONS

International Search Report, dated Jul. 8, 2021, in corresponding International Application No. PCT/EP2021/060669 (4 pp.).

*Primary Examiner* — Michael J Jansen, II
*Assistant Examiner* — Ivelisse Martinez Quiles
(74) *Attorney, Agent, or Firm* — STAAS & HALSEY LLP

(57) ABSTRACT

An apparatus for a passenger compartment of a vehicle includes a display panel having an external portion and an internal portion. The passenger compartment is delimited by paneling to separate the passenger compartment from a region outside of the passenger compartment. The internal portion of the display panel is in the passenger compartment of the vehicle. The external portion of the display panel, separated from the passenger compartment by the paneling, is in the region outside of the passenger compartment of the vehicle. The external portion of the display panel is to generate an external display content inside of the region. The apparatus includes a strip in a first opening of the paneling. The strip is to project the external display content of the external portion of the display panel out of the region that is separated from the passenger compartment by the paneling and into the passenger compartment.

20 Claims, 2 Drawing Sheets

(51) Int. Cl.
*B60K 35/10* (2024.01)
*B60K 35/22* (2024.01)
*B60K 35/53* (2024.01)

(52) U.S. Cl.
CPC ........ *B60K 35/53* (2024.01); *B60K 2360/143* (2024.01)

(58) Field of Classification Search
CPC .... B60K 2370/1438; B60K 2370/1534; B60K 2370/23; B60K 2370/334; B60K 37/06; B60K 2370/1533; B60K 35/10; B60K 35/22; B60K 35/53; B60K 2360/143; B60K 2360/1438; B60K 2360/23; B60K 2360/334; B60K 2360/344; B60K 35/223
See application file for complete search history.

(56) References Cited

U.S. PATENT DOCUMENTS

| | | | | |
|---|---|---|---|---|
| 2020/0079218 A1* | 3/2020 | Hélot | .................. | G06F 3/04847 |
| 2021/0216183 A1* | 7/2021 | Kang | ..................... | B60K 35/00 |

FOREIGN PATENT DOCUMENTS

| | | | | |
|---|---|---|---|---|
| DE | 102017218243 | B3 | 2/2019 | |
| DE | 112017005087 | T5 | 8/2019 | |
| DE | 10 2019 203 264 | B3 | 4/2020 | |
| EP | 1559609 | A1 * | 8/2005 | ............ B60K 35/00 |
| EP | 1559609 | A1 | 8/2005 | |
| EP | 1637387 | A1 | 3/2006 | |

\* cited by examiner

ARRANGEMENT FOR A PASSENGER COMPARTMENT OF A VEHICLE

CROSS REFERENCE TO RELATED APPLICATIONS

This application is a U.S. national stage of International Application No. PCT/EP2021/060669, filed on Apr. 23, 2021. The International Application claims the priority benefit of German Application No. 10 2020 112 938.6 filed on May 13, 2020. Both the International Application and the German Application are incorporated by reference herein in their entirety.

BACKGROUND

This disclosure relates to an arrangement for a passenger compartment of a vehicle and to a method for making a display content available.

Displays for vehicles are becoming ever larger, with it being possible for a particular display to be positioned in a vehicle cockpit at the most diverse places.

A display arrangement is described in printed publication DE 10 2014 009 609 A1.

A method for producing a touch-sensitive operating arrangement is known from printed publication DE 10 2017 218 243 B3.

Printed publication DE 11 2017 005 087 T5 describes a control unit.

SUMMARY

Against this background, an aspect of this disclosure is to upgrade a display content of a display panel.

The apparatus (or arrangement) according to the present disclosure for a passenger compartment of a vehicle includes a display panel that is flexible in configuration with an external portion and with an internal portion, the passenger compartment being delimited by a wall or paneling which has been configured to separate the passenger compartment from a region outside the passenger compartment. This region is likewise arranged in the vehicle, with it being possible for further appliances of the vehicle and components of the apparatus to have been arranged or accommodated in the region. The internal portion of the display panel is, by definition, arranged, capable of being arranged, or to be arranged in the passenger compartment of the vehicle. The external portion of the display panel, separated from the passenger compartment by the paneling, is, by definition, arranged, capable of being arranged, or to be arranged outside the passenger compartment of the vehicle. The apparatus includes a customarily optical strip which is arranged in a first opening or in a first passage of the paneling or of a wall for the passenger compartment between the passenger compartment and the region. The external portion of the display panel has been configured to generate an external display content in the passenger compartment or—to be more exact—inside the passenger compartment, the strip having been configured to project the external display content of the second external portion of the display panel out of the region separated from the passenger compartment by the paneling, which may be partially enclosed by the paneling or the wall, into the passenger compartment.

The apparatus may have been configured for an instrument panel or dashboard of the vehicle and may have been at least partially arranged therein. The external portion of the display panel—arranged or to be arranged in the region—is at least partially enclosed by the instrument panel and, separated from the passenger compartment by the paneling of the instrument panel, arranged, capable of being arranged, or to be arranged outside the passenger compartment. The internal portion of the display panel is arranged, capable of being arranged, or to be arranged inside the passenger compartment, the paneling having been configured to enclose the instrument panel at least partially and to delimit it in relation to the passenger compartment.

The customarily optical strip of the apparatus includes an at least partially or completely transparent body which has been configured to communicate and/or to transmit the external display content from the region into the passenger compartment, the transparent body being transmitting in respect of the external display content. The external display content generated in the region of the external portion of the display panel is conducted along the strip or—to be more exact—along the body thereof from the region outside the passenger compartment into the passenger compartment, it being possible, depending on the definition, that the display content or light has been or is transmitted transversely through the strip.

Moreover, the strip includes a reflecting surface or a mirror which may bound the body of the strip, for instance along or on one side, and has been configured to reflect or to mirror the external display content out of the region into the passenger compartment.

In addition, the strip includes a touch-sensitive surface which is oriented into the passenger compartment and has been configured to detect a contact and to cause a function of the vehicle to be executed on the basis of this contact. The surface may be at least partially transparent and may have been configured to represent a further display content, in which case this surface may take the form of, and/or be designated as, a touch-sensitive additional display panel or a touchscreen, it being possible for the surface to image or display the external display content. A particular function of the vehicle can be represented with the or on the surface by a symbol, the function being caused to be executed as a result of touching of the symbol. In this case, the strip is used for the purpose of switching—for instance, switching on and/or activating—the particular function.

A second opening or a second passage may have been arranged or may have to be arranged in the paneling, through which the display panel is to be conducted, or has been conducted, or is conducted out of the region outside the passenger compartment into the passenger compartment. The second opening in the paneling has been configured to divide up the display panel into the external portion of the display panel in the region outside the passenger compartment and into the internal portion of the display panel, which is arranged, capable of being arranged, or to be arranged in the passenger compartment.

The apparatus may include a motor which is arranged, or to be arranged in the region outside the passenger compartment, the motor having been configured to position and/or to move or—to be more exact—traverse the display panel relative to the second opening and in the process to move it through the second opening at least partially into the passenger compartment or into the region. Depending upon the position of the motor, the display panel is to be divided up, or capable of being divided up proportionally into the external portion in the region outside the passenger compartment and into the internal portion in the passenger compartment.

The method according to the present disclosure is provided for the purpose of making available—for instance, for representing—a display content of a display panel with an apparatus—for instance, with an embodiment of the apparatus presented above—for a passenger compartment of a vehicle. The apparatus that is used in this connection includes a, for instance, flexible display panel with an external portion and with an internal portion. The passenger compartment is at least partially delimited by a wall or paneling which has been configured to separate the passenger compartment from a region outside the passenger compartment, this region nevertheless being arranged in the vehicle. The internal portion of the display panel has been or is arranged, by definition, in the passenger compartment of the vehicle. The external portion of the display panel, separated from the passenger compartment by the paneling, is or has been arranged outside the passenger compartment of the vehicle. In this connection, an external display content is generated and/or represented or displayed by the external portion of the display panel. The apparatus includes a customarily optical or optically active strip which is or has been arranged in a first opening of the paneling or wall. In the course of the method, the external display content generated or made available by the second external portion of the display panel is projected into the passenger compartment by the strip and/or from the strip out of the region that is separated from the passenger compartment by the paneling.

In addition, an internal display content is generated and/or represented by the internal portion of the display panel in the passenger compartment. The internal and external portions of the display panel include an overall contiguous surface area of the display panel, which, depending upon the position of the motor, has been or is divided up into a surface area of the internal portion in the passenger compartment and into a surface area of the external portion in the region. If the display panel has been or is extended by the motor, the internal portion in the passenger compartment is larger than the external portion in the region. If the display panel has been or is retracted by the motor, the internal portion in the passenger compartment is smaller than the external portion in the region. Irrespective of a position of the motor and/or of the display panel relative to the second opening in the paneling, the external display content of the external portion of the display panel is transmitted into the passenger compartment in optically visible manner with the strip.

The apparatus that has been presented may take the form of, or be designated as, a display apparatus and/or operating apparatus and includes the, for instance, flexible display panel or display.

Accordingly, the proposed apparatus may take the form of, and/or be designated as, a display apparatus in which at least a part of the display panel or display retracted into the region can be utilized with the strip in the paneling for display purposes and operating purposes. To do this, the strip with the optical body or with an optical element is utilized. In this connection, the light radiated in the region of the external portion of the display panel is utilized for the purpose of making the external display content available. The external display content or—to be more exact—the light is coupled into the strip and reflected from the reflecting surface or from a mirror surface of the strip in the direction of the observer, customarily in the direction of an eye of the driver. Hence, among other things, a cost-effective illumination—for instance, ambient lighting in the passenger compartment—can be realized.

The touch-sensitive strip—for instance, the switch strip—as man/machine interface makes possible, in addition, operating actions, for instance for manual input of commands for functions. With the display panel and/or from the display panel, various and/or arbitrary contents—as a rule, display contents—can be reflected into the strip which, for instance, takes the form of, or is to be designated as, a switch strip. Hence it is also conceivable to assign functions—in a refinement, only functions—to the strip, depending on a particular application or case of use, such functions being represented by symbols. In this case it is not necessary that the strip contains its own display functionality.

The apparatus includes a traversable display panel which may already be present and which is located at least partially in the region that is customarily not visible from the passenger compartment, or which is arranged in this region and concealed therein. This customarily invisible external display content of the display panel is visualized or made optically accessible for the observer or user with the strip through an outbreak or through the first opening in the paneling or in a paneling part of the instrument panel, the strip being used as an additional optically conductive element inside the paneling. In this case, symbols, for example, can be reflected into the strip from the external portion of the display panel as external display content.

In addition, the strip as optical element can be furnished with sensory elements, in order to detect an operating action and to trigger a function coupled therewith and/or to cause this function to be triggered. The strip has been configured to sense a, for instance, manual contact (touch) and/or a force. Moreover, an optical evaluation of a symbol touched in the process is also possible.

The display panel can also be utilized in the retracted state. In addition, a simple implementation of a freely assignable operating unit without its own display is possible. The apparatus can be utilized for ambient lighting functions. The display panel can be variably configured as regards its size or a visible display area, since it has been configured to be capable, for example, of being retracted and extended into the paneling of the instrument panel that delimits the passenger compartment. The customarily flexible or elastically deformable display panel is of relatively compact design in the retracted state. In this case, it is also possible to utilize the retracted display panel or the external portion thereof for the display of display contents.

It will be understood that the features mentioned above, and those yet to be elucidated below, are capable of being used not only in the respectively specified combination but also in other combinations or on their own without departing from the scope of the present disclosure.

BRIEF DESCRIPTION OF THE DRAWINGS

These and other aspects and advantages will become more apparent and more readily appreciated from the following description of exemplary embodiments, taken in conjunction with the accompanying drawings, wherein identical components are identified by identical reference signs. In the figures.

DETAILED DESCRIPTION

Figure 1:
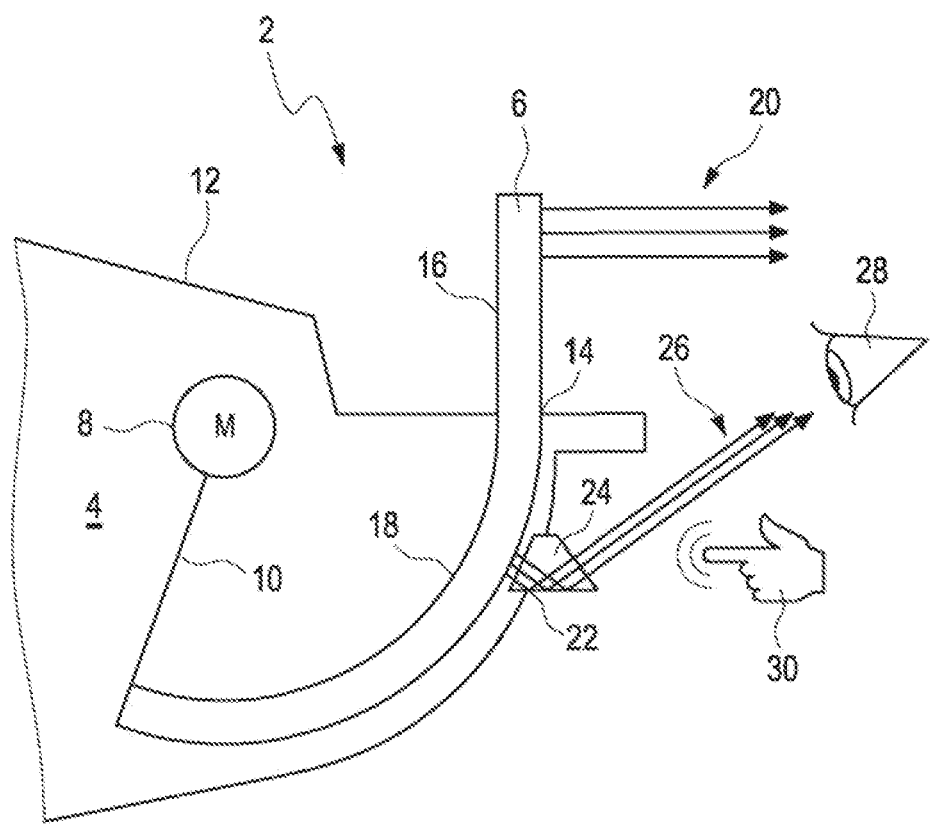
FIG. 1 shows a first operating situation according to an example.
Figure 2:
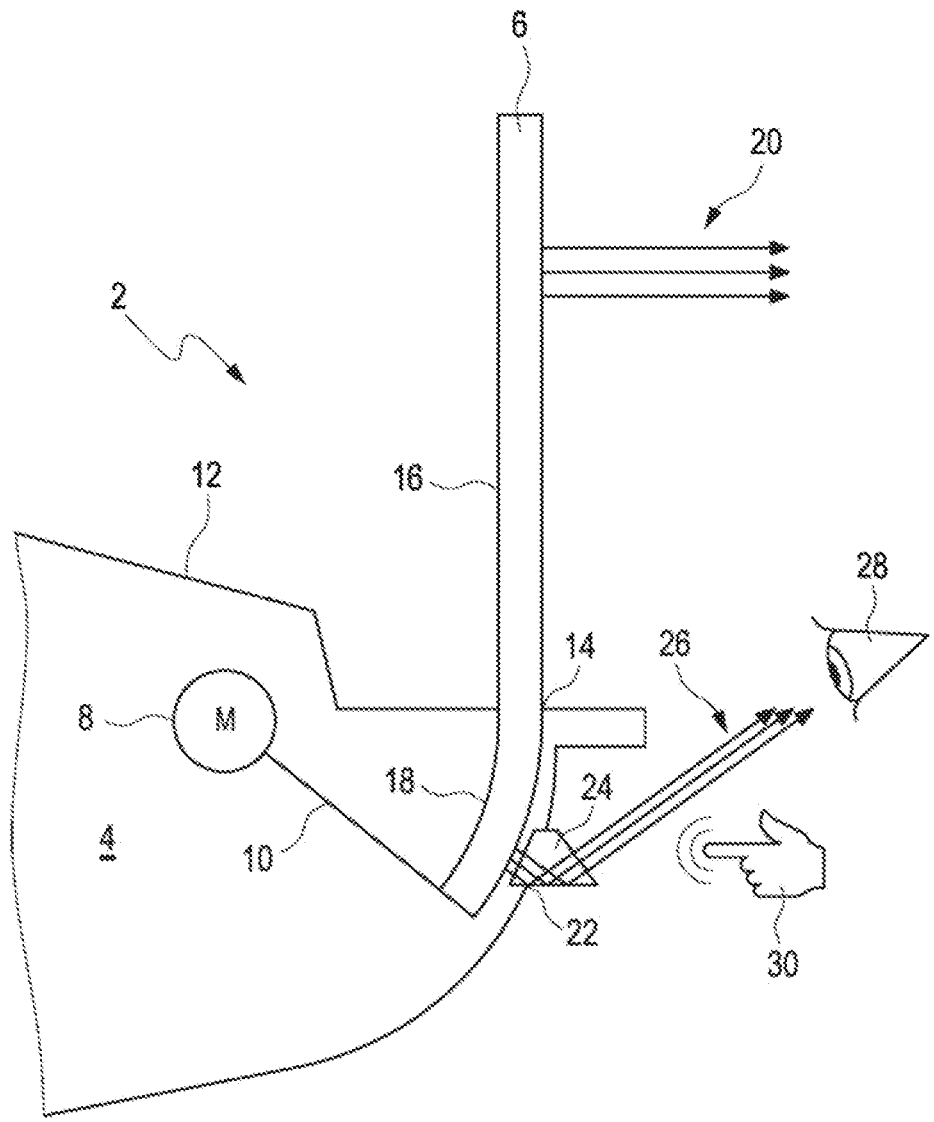
FIG. 2 shows a second operating situation according to an example.

The example of the arrangement (or apparatus) 2 according to the present disclosure represented schematically in each of FIGS. 1 and 2 is arranged here, depending upon the operating situation, at least partially in an instrument panel 4 or dashboard of a passenger compartment or of a cockpit of a vehicle—here, a motor vehicle. The apparatus 2 includes a display panel 6, which here is flexible and/or elastically deformable, and a motor 8 or a kinematic unit, to which the display panel 6 has been fastened via an arm 10. In this case, paneling 12 or a wall of the instrument panel 4 has been configured to separate a region in which the motor 8 and the arm 10 are arranged from the passenger compartment, and to enclose this region, this region, however, being arranged here in the vehicle, by definition, outside the passenger compartment. Moreover, the paneling 12 of the instrument panel 4 includes a first opening 22 and a second opening 14, each opening 14, 22 having been configured to make available, respectively, a passage between the region of the instrument panel 4 and the passenger compartment of the vehicle.

The second opening 14 here takes the form of a slit, for instance, through which the display panel 6 has been conducted and is traversable or can be traversed with the motor 8 into the cockpit or the passenger compartment of the vehicle but also into the region that is enclosed by the paneling 12 of the instrument panel 4. An internal portion 16 of the display panel 6 is arranged in the passenger compartment outside the instrument panel 4, and an external portion 18 of the display panel 6 is arranged inside the instrument panel 4 and outside the passenger compartment. Correspondingly, the external portion 18 is arranged inside the instrument panel 4 and enclosed by the paneling 12, and the internal portion 16 is arranged in the passenger compartment outside the instrument panel 4, both portions 16, 18 having been formed coherently and/or in one piece. In each instance a surface area of a portion 16, 18 forms a part of an overall surface area of the display panel 6. The external portion 18 of the display panel 6 is partially bent inside the region.

Depending upon the position of the motor 8, the internal portion 16 of the display panel 6, which is visible in the passenger compartment and arranged outside the instrument panel 4, and consequently a surface area that is available for a visible display content outside the instrument panel 4, can be varied. The larger the internal portion 16 or—to be more exact—the surface area thereof in the passenger compartment outside the instrument panel 4, the smaller the external portion 18 or—to be more exact—the surface area thereof inside the instrument panel 4 or—to be more exact—inside the region that is arranged in the instrument panel 4 and separated from the passenger compartment by the paneling 12.

In the first operating situation represented in FIG. 1, when the display panel 6 has been retracted into the instrument panel 4, this internal portion 16 of the display panel 6 outside the instrument panel 4 is smaller than the external portion 18 of the display panel 6 inside the instrument panel 4. On the other hand, in the second operating situation represented on the basis of FIG. 2, when the display panel 6 has been extended from or pulled out of the instrument panel 4, the internal portion 16 of the display panel 6 outside the instrument panel 4 is larger than the external portion 18 of the display panel 6 inside the instrument panel 4.

Moreover, an internal display content of the display panel 6, generated outside the instrument panel 4, is illustrated in FIGS. 1 and 2 by first arrows 20. In the first operating situation represented in FIG. 1, when the display panel 6 has been retracted into the instrument panel 4, this internal display content is smaller than in the second operating situation represented on the basis of FIG. 2, when the display panel 6 has been extended from or pulled out of the instrument panel 4.

In addition, depending upon the definition, the first opening 22 also takes the form of a component of the apparatus 2, a strip 24 of the apparatus 2 being arranged in the first opening 22. Here, the second opening 14 is arranged above the first opening 22 with respect to a vertical axis of the vehicle or of the cockpit. Correspondingly, the first opening 22, in which the strip 24 is arranged, is arranged below the second opening 14 through which the display panel 6 has been conducted.

The strip 24 has been configured to transmit an external display content of the display panel 6, generated inside the instrument panel 4 and indicated here by second arrows 26, from an interior space of the instrument panel 4, which is enclosed by the paneling 12 thereof, from a surface of the external portion 18 of the display panel 6 into the passenger compartment in the direction of an observer, the external display content being mirrored or reflected out of the instrument panel 4 from a reflecting surface of the strip 24, the observer—here, for instance, a driver of the vehicle—being represented schematically by an eye 28. The strip 24 further includes a body that is transmitting in respect of light, or transparent, and that here is trapezoidal in cross-section and has been configured to transmit the external display content out of the region enclosed by the instrument panel 4 into the passenger compartment.

In addition, FIGS. 1 and 2 show a hand 30 of the observer, in which connection the observer can manually operate a touch-sensitive surface of the strip 24, which here is arranged outside the instrument panel 4 and is accessible from the passenger compartment, with his/her hand 30, for instance with his/her fingers, and can bring about an execution of a function of the vehicle, which is symbolized by the external display content in the instrument panel 4 and is visible for the observer in the passenger compartment.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

REFERENCE SYMBOLS 2 arrangement (or apparatus)
4 instrument panel
6 display panel
8 motor
10 arm
12 paneling
14 opening
16, 18 portion
20 arrows
22 opening
24 strip
26 arrows
28 eye
30 hand

The invention claimed is:
1. An apparatus for a passenger compartment of a vehicle, the apparatus comprising:
a display panel including:

an internal portion in the passenger compartment of the vehicle, the passenger compartment delimited by paneling to separate the passenger compartment from a region outside of the passenger compartment, the internal portion to project internal display content into the passenger compartment; and an external portion, in the region outside of the passenger compartment, to generate an external display content inside of the region outside of the passenger compartment; and a strip, trapezoidal in cross-section and in a first opening of the paneling, to project the external display content of the external portion out of the region outside of the passenger compartment separated from the passenger compartment by the paneling and into the passenger compartment, wherein the internal display content projected into the passenger compartment is smaller when the internal portion is retracted into the region outside of the passenger compartment than when the internal portion is extended from the region outside of the passenger compartment.

2. The apparatus as claimed in claim 1, further comprising an instrument panel of the vehicle, wherein the external portion of the display panel to be arranged in the region outside of the passenger compartment is at least partially enclosed by the instrument panel.

3. The apparatus as claimed in claim 2, wherein the strip includes an at least partially transparent body to communicate the external display content into the passenger compartment.

4. The apparatus as claimed in claim 3, wherein the strip includes a reflecting surface to reflect the external display content out of the region outside of the passenger compartment and into the passenger compartment.

5. The apparatus as claimed in claim 3, wherein the strip includes a touch-sensitive surface to detect a contact and to cause a function of the vehicle to be executed based on the contact.

6. The apparatus as claimed in claim 2, wherein the strip includes a reflecting surface to reflect the external display content out of the region outside of the passenger compartment and into the passenger compartment.

7. The apparatus as claimed in claim 6, wherein the strip includes a touch-sensitive surface to detect a contact and to cause a function of the vehicle to be executed based on the contact.

8. The apparatus as claimed in claim 2 wherein the strip includes a touch-sensitive surface to detect a contact and to cause a function of the vehicle to be executed based on the contact.

9. The apparatus as claimed in claim 2, wherein the display panel is conducted out of the region outside the passenger compartment into the passenger compartment through a second opening in the paneling.

10. The apparatus as claimed in claim 2, further comprising a motor in the region outside of the passenger compartment, the motor to move the display panel and to divide the display panel into the external portion and the internal portion.

11. The apparatus as claimed in claim 1, wherein the strip includes an at least partially transparent body to communicate the external display content into the passenger compartment.

12. The apparatus as claimed in claim 11, wherein the strip includes a reflecting surface to reflect the external display content out of the region outside of the passenger compartment and into the passenger compartment.

13. The apparatus as claimed in claim 11, wherein the strip includes a touch-sensitive surface to detect a contact and to cause a function of the vehicle to be executed based on the contact.

14. The apparatus as claimed in claim 1, wherein the strip includes a reflecting surface to reflect the external display content out of the region outside of the passenger compartment and into the passenger compartment.

15. The apparatus as claimed in claim 14, wherein the strip includes a touch-sensitive surface to detect a contact and to cause a function of the vehicle to be executed based on the contact.

16. The apparatus as claimed in claim 1, wherein the strip includes a touch-sensitive surface to detect a contact and to cause a function of the vehicle to be executed based on the contact.

17. The apparatus as claimed in claim 1, wherein the display panel is conducted out of the region outside the passenger compartment into the passenger compartment through a second opening in the paneling.

18. The apparatus as claimed in claim 1, further comprising a motor in the region outside of the passenger compartment, the motor to move the display panel and to divide the display panel into the external portion and the internal portion.

19. An apparatus as claimed in claim 1, wherein the display panel is a flexible and/or elastically deformable display panel.

20. A method for making available a display content of a display panel to a passenger compartment of a vehicle, the method comprising:

separating the display panel into an internal portion in the passenger compartment of the vehicle and an external portion outside of the passenger compartment, the passenger compartment delimited from a region outside of the passenger compartment by paneling;

generating an external display content by the external portion of the display panel inside of the region outside of the passenger compartment;

generating an internal display content by the internal portion of the display panel and displaying the internal display content into the passenger compartment; and projecting, by a strip trapezoidal in cross-section and in a first opening of the paneling, the external display content of the external portion out of the region outside of the passenger compartment and into the passenger compartment, wherein the internal display content projected into the passenger compartment is smaller when the internal portion is retracted into the region outside of the passenger compartment than when the internal portion is extended from the region outside of the passenger compartment.

* * * * *